United States Patent [19]

Field

[11] Patent Number: 4,579,831
[45] Date of Patent: Apr. 1, 1986

[54] METHOD OF ZEOLITIC CATALYST MANUFACTURE

[75] Inventor: Leslie A. Field, Oakland, Calif.

[73] Assignee: Chevron Research Company, San Francisco, Calif.

[21] Appl. No.: 480,033

[22] Filed: Mar. 29, 1983

[51] Int. Cl.⁴ .................. B01J 29/12; B01J 21/04
[52] U.S. Cl. ................................ 502/66; 502/64
[58] Field of Search ............ 502/70, 66, 69, 64; 208/138; 423/244 A, 244 R

[56] References Cited

U.S. PATENT DOCUMENTS

| | | | |
|---|---|---|---|
| 2,915,458 | 12/1959 | Slyngstad et al. | 208/138 |
| 3,376,215 | 4/1968 | Bertolacini et al. | 208/138 |
| 3,557,024 | 1/1971 | Young et al. | 502/66 |
| 3,677,973 | 7/1972 | Mitsche et al. | 502/70 |
| 3,819,502 | 6/1974 | Oishi | 208/138 X |
| 4,165,275 | 8/1979 | Blanton, Jr. et al. | 423/244 R |
| 4,243,826 | 1/1981 | Antos | 208/138 X |
| 4,323,544 | 4/1982 | Magder | 423/244 A |
| 4,332,699 | 1/1982 | Nozemack | 502/70 X |

*Primary Examiner*—Carl F. Dees
*Attorney, Agent, or Firm*—S. R. LaPaglia; W. K. Turner; E. A. Schaal

[57] ABSTRACT

A method of forming a sulfur-resistant catalyst is disclosed wherein a zeolite is bound with an alumina containing either an alkali or alkaline earth component. In one embodiment of this method, a solution of an alkali metal aluminate or alkaline earth metal aluminate is formed, the pH of the alkali metal aluminate solution is adjusted to a pH of from 6 to 8, and the solution is aged and mulled with a large-pore zeolite to form a mixture. This mixture is extruded to form an extrudate, which is dried, calcined, and impregnated with a Group VIII metal to form a catalyst. Finally, the catalyst is dried and calcined.

21 Claims, No Drawings

METHOD OF ZEOLITIC CATALYST MANUFACTURE

BACKGROUND OF THE INVENTION

The invention relates to a method of making a new catalyst which is useful in reforming hydrocarbons.

Catalytic reforming is well known in the petroleum industry and refers to the treatment of naphtha fractions to improve the octane rating by the production of aromatics. The more important hydrocarbon reactions occurring during reforming operation include dehydrogenation of cyclohexanes to aromatics, dehydroisomerization of alkylcyclopentanes to aromatics, and dehydrocyclization of acyclic hydrocarbons to aromatics. A number of other reactions also occur, including the following: dealkylation of alkylbenzenes, isomerization of paraffins, and hydrocracking reactions which produce light gaseous hydrocarbons, e.g., methane, ethane, propane and butane. Hydrocracking reactions are to be particularly minimized during reforming as they decrease the yield of gasoline boiling products.

Because of the demand for high octane gasoline for use as motor fuels, etc., extensive research is being devoted to the development of improved reforming catalysts and catalytic reforming processes. Catalysts for successful reforming processes must possess good selectivity, i.e., be able to produce high yields of liquid products in the gasoline boiling range containing large concentrations of high octane number aromatic hydrocarbons and accordingly, low yields of light gaseous hydrocarbons. The catalysts should possess good activity in order that the temperature required to produce a certain quality product need not be too high. It is also necessary that catalysts possess good stability in order that the activity and selectivity characteristics can be retained during prolonged periods of operation.

Catalysts comprising platinum, for example, platinum supported on alumina, are well known and widely used for reforming of naphthas. The most important products of catalytic reforming are benzene and alkylbenzenes. These aromatic hydrocarbons are of great value as high octane number components of gasoline.

Catalytic reforming is also an important process for the chemical industry because of the great and expanding demand for aromatic hydrocarbons for use in the manufacture of various chemical products such as synthetic fibers, insecticides, adhesives, detergents, plastics, synthetic rubbers, pharmaceutical products, high octane gasoline, perfumes, drying oils, ion-exchange resins, and various other products well known to those skilled in the art. One example of this demand is in the manufacture of alkylated aromatics such as ethylbenzene, cumene and dodecylbenzene by using the appropriate mono-olefins to alkylate benzene. Another example of this demand is in the area of chlorination of benzene to give chlorobenzene which is then used to prepare phenol by hydrolysis with sodium hydroxide. The chief use for phenol is in the manufacture of phenol-formaldehyde resins and plastics. Another route to phenol uses cumene as a starting material and involves the oxidation of cumene by air to cumene hydroperoxide which can then be decomposed to phenol and acetone by the action of an appropriate acid. The demand for ethylbenzene is primarily derived from its use to manufacture styrene by selective dehydrogenation; styrene is in turn used to make styrene-butadiene rubber and polystyrene. Ortho-xylene is typically oxidized to phthalic anhydride by reaction in vapor phase with air in the presence of a vanadium pentoxide catalyst. Phthalic anhydride is in turn used for production of plasticizers, polyesters and resins. The demand for para-xylene is caused primarily by its use in the manufacture of terephthalic acid or dimethylterephthalate which in turn is reacted with ethylene glycol and polymerized to yield polyester fibers. Substantial demand for benzene also is associated with its use to produce aniline, nylon, maleic anhydride, solvents and the like petrochemical products. Toluene, on the other hand, is not, at least relative to benzene and the $C_8$ aromatics, in great demand in the petrochemical industry as a basic building block chemical; consequently, substantial quantities of toluene are hydrodealkylated to benzene or disproportionated to benzene and xylene. Another use for toluene is associated with the transalkylation of trimethylbenzene with toluene to yield xylene.

Responsive to this demand for these aromatic products, the art has developed and industry has utilized a number of alternative methods to produce them in commercial quantities. One response has been the construction of a significant number of catalytic reformers dedicated to the production of aromatic hydrocarbons for use as feedstocks for the production of chemicals. As is the case with most catalytic processes, the principal measure of effectiveness for catalytic reforming involves the ability of the process to convert the feedstocks to the desired products over extended periods of time with minimum interference of side reactions.

The dehydrogenation of cyclohexane and alkylcyclohexanes to benzene and alkylbenzenes is the most thermodynamically favorable type of aromatization reaction of catalytic reforming. This means that dehydrogenation of cyclohexanes can yield a higher ratio of (aromatic product/nonaromatic reactant) than either of the other two types of aromatization reactions at a given reaction temperature and pressure. Moreover, the dehydrogenation of cyclohexanes is the fastest of the three aromatization reactions. As a consequence of these thermodynamic and kinetic considerations, the selectivity for the dehydrogenation of cyclohexanes is higher than that for dehydroisomerization or dehydrocyclization. Dehydroisomerization of alkylcyclopentanes is somewhat less favored, both thermodynamically and kinetically. Its selectivity, although generally high, is lower than that for dehydrogenation. Dehydrocyclization of paraffins is much less favored both thermodynamically and kinetically. In conventional reforming, its selectivity is much lower than that for the other two aromatization reactions.

The selectivity disadvantage of paraffin dehydrocyclization is particularly large for the aromatization compounds having a small number of carbon atoms per molecule. Dehydrocyclization selectivity in conventional reforming is very low for $C_6$ hydrocarbons. It increases with the number of carbon atoms per molecule, but remains substantially lower than the aromatization selectivity for dehydrogenation or dehydroisomerization of naphthenes having the same number of carbon atoms per molecule. A major improvement in the catalytic reforming process will require, above all else, a drastic improvement in dehydrocyclization selectivity that can be achieved while maintaining adequate catalyst stability.

In the dehydrocyclization reaction, acyclic hydrocarbons are both cyclized and dehydrogenated to produce aromatics. The conventional methods of performing these dehydrocyclization reactions are based on the use of catalysts comprising a noble metal on a carrier. Known catalysts of this kind are based on alumina carrying 0.2% to 0.8% by weight of platinum and preferably a second auxiliary metal.

A disadvantage of most catalysts is that with $C_6$–$C_8$ paraffins, they are usually more selective for other reactions (such as hydrocracking) than they are for dehydrocyclization. A major advantage of the catalyst of the present invention is its high selectivity for dehydrocyclization.

The possibility of using carriers other than alumina has also been studied and it was proposed to use certain molecular sieves such as X and Y zeolites, which have pores large enough for hydrocarbons in the gasoline boiling range to pass through. However, catalysts based upon these molecular sieves have not been commercially successful.

In the conventional method of carrying out the aforementioned dehydrocyclization, acyclic hydrocarbons to be converted are passed over the catalyst, in the presence of hydrogen, at temperatures of the order of 500° C. and pressures of from 5 to 30 bars. Part of the hydrocarbons are converted into aromatic hydrocarbons, and the reaction is accompanied by isomerization and cracking reactions which also convert the paraffins into isoparaffins and lighter hydrocarbons.

The rate of conversion of the acyclic hydrocarbons into aromatic hydrocarbons varies with the number of carbon atoms per reactant molecule, reaction conditions and the nature of the catalyst.

The catalyst hitherto used have given moderately satisfactory results with heavy paraffins, but less satisfactory results with $C_6$–$C_8$ paraffins, particularly $C_6$ paraffins. Catalysts based on a type L zeolite are more selective with regard to the dehydrocyclization reaction; they can be used to improve the rate of conversion to aromatic hydrocarbons without requiring higher temperatures than those dictated by thermodynamic considerations (higher temperatures usually have a considerable adverse effect on the stability of the catalyst); and produce excellent results with $C_6$–$C_8$ paraffins, but catalysts based on type L zeolite have not achieved commercial usage, apparently because of inadequate stability. A major disadvantage of this catalyst is its high sensitivity to sulfur.

In one method of dehydrocyclizing aliphatic hydrocarbons, hydrocarbons are contacted in the presence of hydrogen with a catalyst consisting essentially of a type L zeolite having exchangeable cations of which at least 90% are alkali metal ions selected from the group consisting of ions of lithium, sodium, potassium, rubidium and cesium and containing at least one metal selected from the group which consists of metals of Group VIII of the Periodic Table of Elements, tin and germanium, said metal or metals including at least one metal from Group VIII of said Periodic Table having a dehydrogenating effect, so as to convert at least part of the feedstock into aromatic hydrocarbons.

To be used commercially, the catalyst is pelletized. The resulting pellets have sufficient strength so that they will not disintegrate in the reactor.

SUMMARY OF THE INVENTION

The present invention is based in part on the discovery that, by using an alumina that contains either an alkali or an alkaline earth component as a binder, a sulfur-resistant catalyst can be formed having high activity and selectivity for the aromatization reaction. In one embodiment, this catalyst is formed by forming a solution of an alkali metal aluminate or an alkaline earth metal aluminate; adjusting the pH of the aluminate solution to a pH of from 6 to 8; aging, filtering, then mulling the aluminate solution with a large-pore zeolite to form a mixture; extruding the mixture to form an extrudate; drying, calcining, and impregnating the extrudate with a Group VIII metal to form a catalyst (preferably with a solution of $Pt(NH_3)_4(NO_3)_2$ or $Pt(NH_3)_4Cl_2$); then drying and calcining the catalyst.

Preferably, the alkali metal is selected from the group consisting of sodium and potassium and the alkaline earth metal is selected from the group consisting of barium and calcium. The pH of the aluminate solution is preferably adjusted by adding nitric acid, then the solution is aged at 95° C. for about 48 hours, and then washed. Preferably the aged aluminate solution is dried prior to mulling.

In further embodiments, the alkali metal or alkaline earth metal is incorporated into the alumina binder before binding, either comulled with the alumina, or impregnated on the alumina, or impregnated onto a fraction of the alumina and bound with non-alkali containing alumina. In these embodiments, it may be more than usually desirable to subject the bound material to a barium ion exchange, to neutralize any acidity in the alumina.

The preferred large-pore zeolite has an apparent pore size of from 7 to 9 Angstroms and is selected from the group consisting of zeolite X, zeolite Y and type L zeolite. The preferred large-pore zeolite is a type L zeolite with the majority of the crystals of the type L zeolite larger than 500 Angstroms (more preferably larger than 1000 Angstroms). Most preferably, at least 80% of the crystals of the type L zeolite are larger than 1000 Angstroms.

In one embodiment, the extrudate is ion exchanged with an alkaline earth metal selected from the group consisting of barium, strontium, and calcium. Preferably, the catalyst has from 0.1% to 35% by weight barium (more preferably from 8% to 15% by weight barium) and from 0.1% to 5% by weight platinum (more preferably from 0.3% to 2.5% by weight platinum).

DESCRIPTION OF THE PREFERRED EMBODIMENTS

In its broadest aspect, the present invention involves a method of preparing a zeolitic catalyst which has high activity and high selectivity for the dehydrocyclization reaction, but which is less sensitive to sulfur poisoning than prior art zeolitic catalysts.

Catalyst Preparation

This catalyst can be formed by forming a solution of an alkali metal aluminate or an alkaline earth metal aluminate, then adjusting the pH of the solution to a pH of from 6 to 8, and aging the solution. Then the aluminate solution is filtered, dried, and mulled with a large-pore zeolite to form a mixture, and the mixture is extruded to form an extrudate, which is dried, calcined, and impregnated or exchanged with a Group VIII metal to form a catalyst. This catalyst is then dried and calcined.

Examples of alkali metal aluminates that would work include sodium aluminate and potassium aluminate. Examples of alkaline earth metal aluminates that would work include barium aluminate and calcium aluminate. An advantage of using sodium aluminate is that it is commercially available. An advantage of using potassium aluminate is that it is throught that the resulting binder can react with sulfur in the presence of water.

Once the aluminate solution is formed, the pH of that solution is adjusted to a pH of from 6 to 8. This can be done by adding nitric acid, or other mineral acids.

The aluminate solution is aged, and then the solution is washed. The washed aluminate solution is preferably dried prior to mulling.

The zeolite and alumina are mulled together, and the resulting mixture is extruded to form an extrudate. One way to extrude the mixture is by peptizing the mixture with nitric acid, and controlling the moisture level so that a thick paste is formed. This is then forced through a circular dye to yield the catalyst pellet.

The extrudate is dried and calcined to add strength to the resulting catalyst. This first calcination step can be at about 1100° F. for about 2 hours.

After the extrudate has been calcined, it is impregnated with a Group VIII metal to form a catalyst. Preferably, the Group VIII metal is platinum, and preferably the platinum is impregnated in the extrudate using a platinum-containing solution, such as a solution of $Pt(NH_3)_4(NO_3)_2$. The zeolite is preferably impregnated after it has been formed into an extrudate because, if the zeolite is impregnated before the zeolite is formed into the extrudate, then the high calcination temperatures of the first calcination step would cause the platinum to sinter unless the oxygen concentration is kept low. When the oxygen concentration is kept low, impregnation can occur either before or after extrusion.

Then the catalyst is dried and calcined in air. In this second calcination, the temperature should be about 500° F. instead of the 1000° F. used in the first calcination. This is because higher calcination temperatures would cause the platinum on the catalyst to sinter unless low oxygen concentrations are used.

In another embodiment, the catalyst can be formed as above, but using a commercially available alumina, preferably of the gelatinous boehmite type, with the alkali or alkaline earth metal added to the alumina by impregnation or comulling, before or after it is used to bind the zeolite. Useful forms of the alkali or alkaline earth metal include the nitrate, carbonate, oxalate and hydroxide forms.

The term "selectivity" as used in the present invention is defined as the weight percent aromatics formed from acyclic hydrocarbons relative to weight percent converted to aromatics and cracked products, $$\text{i.e., Selectivity} = \frac{100 \times \text{weight percent of aromatics}}{\text{weight percent of aromatics and cracked products}}$$

Isomerization of paraffins and interconversion of paraffins and alkylcyclopentanes having the same number of carbon atoms per molecule are not considered in determining selectivity.

The selectivity for converting acyclic hydrocarbons to aromatics is a measure of the efficiency of the process in converting acyclic hydrocarbons to the desired and valuable products: aromatics and hydrogen, as opposed to the less desirable products of hydrocracking.

Highly selective catalysts produce more hydrogen than less selective catalysts because hydrogen is produced when acyclic hydrocarbons are converted to aromatics and hydrogen is consumed when acyclic hydrocarbons are converted to cracked products. Increasing the selectivity of the process increases the amount of hydrogen produced (more aromatization) and decreases the amount of hydrogen consumed (less cracking).

Another advanage of using highly selective catalyst can be that the hydrogen produced by highly selective catalyst can be purer than that produced by less selective catalysts. This higher purity results because more hydrogen is produced, while less low boiling hydrocarbon (cracked products) are produced. The purity of hydrogen produced in reforming is critical if, as is usually the case in an integrated refinery, the hydrogen produced is utilized in processes such as hydrotreating and hydrocracking, which require at least certain minimum partial pressures of hydrogen. If the purity becomes too low, the hydrogen can no longer be used for this purpose and must be used in a less valuable way, for example as fuel gas.

Feedstock

Regarding the acyclic hydrocarbons that can be converted to aromatics by the catalyst of the present invention, they are most commonly paraffins but can in general be any acyclic hydrocarbon capable of undergoing ring closure to produce an aromatic hydrocarbon. That is, the catalyst of the present invention is useful for the dehydrocyclization of any acyclic hydrocarbon capable of undergoing ring closure to produce an aromatic hydrocarbon and capable of being vaporized at the dehydrocyclization temperatures used herein. More particularly, suitable acyclic hydrocarbons include acyclic hydrocarbons containing 6 or more carbon atoms per molecule such as $C_6$–$C_{20}$ paraffins, and $C_6$–$C_{20}$ olefins. Specific examples of suitable acyclic hydrocarbons are: (1) paraffins such as n-hexane, 2-methylpentane, 3-methylpentane, n-heptane, 2-methylhexane, 3-methylhexane, 3-ethylpentane, 2,5-dimethylhexane, n-octane, 2-methylheptane, 3-methylheptane, 4-methylheptane, 3-ethylhexane, n-nonane, 2-methyloctane, 3-methyloctane, n-decane and the like compounds; and (2) olefins such as 1-hexene, 2-methyl-1-pentene, 1-heptene, 1-octene, 1-nonene and the like compounds.

In the case of a feedstock which is not already low in sulfur, acceptable levels can be reacted by hydrogenating the feedstock in a presaturation zone where the naphtha is contacted with a hydrogenating catalyst which is resistant to sulfur poisoning. A suitable catalyst for this hydrodesulfurization process is, for example, an alumina-containing support and a minor proportion of molybdenum oxide, cobalt oxide and/or nickel oxide. Hydrodesulfurization is ordinarily conducted at 315° C. to 455° C., at 200 to 2000 psig, and at a liquid hourly space velocity of 1 to 5. The sulfur and nitrogen contained in the naphtha are converted to hydrogen sulfide and ammonia, respectively, which can be removed prior to reforming by suitable conventional processes.

Dehydrocyclization Reaction

The catalyst of the present invention can be used to form aromatics by contacting acyclic hydrocarbons with the catalyst in a dehydrocyclization zone maintained at dehydrocyclization conditions. This contacting may be accomplished by using the catalyst in a fixed bed system, a moving bed system, a fluidized system, or in a batch-type operation; however, in view of the danger of attrition losses of the valuable catalyst and of well-known operational advantages, it is preferred to use either a fixed bed system or a dense-phase moving bed system. In a fixed bed system, the acyclic hydrocarbon-containing charge stock is preheated by any suitable heating means to the desired reaction temperature and then passed into a dehydrocyclization zone containing a fixed bed of the catalyst. It is, of course, understood that the dehydrocyclization zone may be one or more separate reactors with suitable means therebetween to ensure that the desired temperature is maintained at the entrance to each reactor. It is also important to note that the reactants may be contacted with the catalyst bed in either upward, downward, or radial flow fashion with the latter being preferred. The dehydrocyclization system then preferably comprises A dehydrocyclization zone containing one or more fixed beds or dense-phase moving beds of the catalyst. In a multiple bed system, the present catalyst may be used in less than all of the beds with a conventional dual-function catalyst being used in the remainder of the beds. The dehydrocyclization zone may be one or more separate reactors with suitable heating means therebetween to compensate for the endothermic nature of the dehydrocyclization reaction that takes place in each catalyst bed.

Although hydrogen is the preferred diluent for use in the subject dehydrocyclization method, in some cases other art-recognized diluents may be advantageously utilized, either individually or in admixture with hydrogen, such as $C_1$ to $C_5$ paraffins such as methane, ethane, propane, butane and pentane; the like diluents, and mixtures thereof. Hydrogen is preferred because it serves the dual function of not only lowering the partial pressure of the acyclic hydrocarbon, but also of suppressing the formation of hydrogen-deficient, carbonaceous deposits (commonly called coke) on the catalytic composite. Ordinarily, hydrogen is utilized in amounts sufficient to insure a hydrogen to hydrocarbon mole ratio of about 0 to about 20:1, with best results obtained in the range of about 2:1 to about 6:1. The hydrogen charged to the dehydrocyclization zone will typically be contained in a hydrogen-rich gas stream recycled from the effluent stream from this zone after a suitable gas/liquid separation step.

The hydrocarbon dehydrocyclization conditions used include a reactor pressure which is selected from the range of about 1 atmosphere to about 500 psig, with the preferred pressure being about 50 psig to about 200 psig. The temperature of the dehydrocyclization is preferably about 450° C. to about 550° C. As is well known to those skilled in the dehydrocyclization art, the initial selection of the temperature within this broad range is made primarily as a function of the desired conversion level of the acyclic hydrocarbon considering the characteristics of the charge stock and of the catalyst. Ordinarily, the temperature then is thereafter slowly increased during the run to compensate for the inevitable deactivation that occurs to provide a relatively constant value for conversion.

The liquid hourly space velocity (LHSV) used is selected from the range of about 0.1 to about 10 hr.$^{-1}$, with a value in the range of about 0.3 to about 5 hr.$^{-1}$ being preferred.

Reforming generally results in the production of hydrogen. Thus, exogenous hydrogen need not necessarily be added to the reforming system except for pre-reduction of the catalyst and when the feed is first introduced. Generally, once reforming is underway, part of the hydrogen produced is recirculated over the catalyst. The presence of hydrogen serves to reduce the formation of coke which tends to poison the catalyst. Hydrogen is preferably introduced into the reforming reactor at a rate varying from 0 to about 20 moles of hydrogen per mole of feed. The hydrogen can be in admixture with light gaseous hydrocarbons.

If, after a period of operation, the catalyst has become deactivated by the presence of carbonaceous deposits, said deposits can be removed from the catalyst by passing an oxygen-containing gas into contact with the catalyst at an elevated temperature in order to burn the carbonaceous deposits from the catalyst. The method of regenerating the catalyst will depend on whether there is a fixed bed, moving bed, or fluidized bed operation. Regeneration methods and conditions are well known in the art.

The Catalyst

The catalyst of the present invention is made by a method which uses an alumina that contains either an alkali or an alkaline earth component as a binder. In one embodiment of this method, a solution of an aluminate is formed, the pH of the aluminate solution is adjusted to a pH of from 6 to 8, and the solution is aged. It can then be washed, dried, and mulled with a large-pore zeolite to form a mixture. Alternatively, a commercially available alumina can be used as a binder for the zeolite. In this embodiment, the alumina should contain at least 100 ppm alkali or alkaline earth component which component is added before or after the alumina is used to bind the zeolite. This mixture is extruded to form an extrudate, which is dried, calcined, and impregnated with a Group VIII metal to form a catalyst. Alternatively, the zeolite may be impregnated with the Group VIII metal prior to extrusion. Finally, the catalyst is dried and calcined.

The preferred catalyst according to the invention is a large-pore zeolite charged with one or more dehydrogenating constituents. The term "large-pore zeolite" is defined as a zeolite having an effective pore diameter of 6 to 15 Angstroms.

Among the large-pored crystalline zeolites which have been found to be useful in the practice of the present invention, type L zeolite, zeolite X, zeolite Y and faujasite are the most important and have apparent pore sizes on the order of 7 to 9 Angstroms.

The chemical formula for zeolite Y expressed in terms of mole oxides may be written as:

$$(0.7-1.1)Na_2O:Al_2O_3:xSiO_2:yH_2O$$

wherein x is a value greater than 3 up to about 6 and y may be a value up to about 9. Zeolite Y has a characteristic X-ray powder diffraction pattern which may be employed with the above formula for identification. Zeolite Y is described in more detail in U.S. Pat. No. 3,130,007. U.S. Pat. No. 3,130,007 is hereby incorporated by reference to show a zeolite useful in the present invention.

Zeolite X is a synthetic crystalline zeolitic molecular sieve which may be represented by the formula:

$$(0.7-1.1)M_{2/n}O:Al_2O_3:(2.0-3.0)SiO_2:yH_2O$$

wherein M represents a metal, particularly alkali and alkaline earth metals, n is the valence of M, and y may have any value up to about 8 depending on the identity of M and the degree of hydration of the crystalline zeolite. Zeolite X, its X-ray diffraction pattern, its properties, and method for its preparation are described in detail in U.S. Pat. No. 2,882,244. U.S. Pat. No. 2,882,244 is hereby incorporated by reference to show a zeolite useful in the present invention.

The preferred catalyst according to the invention is a type L zeolite charged with one or more dehydrogenating constituents.

Type L Zeolite

Type L zeolites are synthetic zeolites. A theoretical formula is $M_{9/n}[(AlO_2)_9(SiO_2)_{27}]$ in which M is a cation having the valency n.

The real formula may vary without changing the crystalline structure; for example, the mole ratio of silicon to aluminum (Si/Al) may vary from 1.0 to 3.5.

Although there are a number of cations that may be present in zeolite L, in one embodiment, it is preferred to synthesize the potassium form of the zeolite, i.e., the form in which the exchangeable cations present are substantially all potassium ions. The reactants accordingly employed are readily available and generally water soluble. The exchangeable cations present in the zeolite may then conveniently be replaced by other exchangeable cations, as will be shown below, thereby yielding isomorphic form of zeolite L.

In one method of making zeolite L, the potassium form of zeolite L is prepared by suitably heating an aqueous metal aluminosilicate mixture whose composition, expressed in terms of the mole ratios of oxides, falls within the range:

$K_2O/(K_2O+Na_2O)$: From about 0.33 to about 1
$(K_2O+Na_2O)/SiO_2$: From about 0.35 to about 0.5
$SiO_2/Al_2O_3$: From about 10 to about 28
$H_2O/(K_2O+Na_2O)$: From about 15 to about 41

The desired product is hereby crystallized out relatively free from zeolites of dissimilar crystal structure.

The potassium form of zeolite L may also be prepared in another method along with other zeolitic compounds by employing a reaction mixture whose composition, expressed in terms of mole ratios of oxides, falls within the following range:

$K_2O/(K_2O+Na_2O)$: From about 0.26 to about 1
$(K_2O+Na_2O)/SiO_2$: From about 0.34 to about 0.5
$SiO_2/Al_2O_3$: From about 15 to about 28
$H_2O/(K_2O+Na_2O)$: From about 15 to about 51

It is to be noted that the presence of sodium in the reaction mixture is not critical to the present invention. However, it has been found that the potassium form of zeolite L is more readily obtained from reaction mixtures in which sodium is incorporated within the range indicated above.

When the zeolite is prepared from reaction mixtures containing sodium, sodium ions are generally also included within the product as part of the exchangeable cations together with the potassium ions. The product obtained from the above ranges has a composition, expressed in terms of moles of oxides, corresponding to the formula:

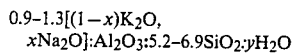

$0.9-1.3[(1-x)K_2O,$
$xNa_2O]:Al_2O_3:5.2-6.9SiO_2:yH_2O$ wherein "x" may be any value from 0 to about 0.75 and "y" may be any value from 0 to about 9.

In making zeolite L, representative reactants are activated alumina, gamma alumina, alumina trihydrate and sodium aluminate as a source of alumina. Silica may be obtained from sodium or potassium silicate, silica gels, silicic acid, aqueous colloidal silica sols and reactive amorphous solid silicas. The preparation of typical silica sols which are suitable for use in the process of the present invention are described in U.S. Pat. No. 2,574,902 and U.S. Pat. No. 2,597,872. Typical of the group of reactive amorphous solid silicas, preferably having an ultimate particle size of less than 1 micron, are such materials as fume silicas, chemically precipitated and precipitated silica sols. Potassium and sodium hydroxide may supply the metal cation and assist in controlling pH.

In making zeolite L, the usual method comprises dissolving potassium or sodium aluminate and alkali, viz., potassium or sodium hydroxide, in water. This solution is admixed with a water solution of sodium silicate, or preferably with a water-silicate mixture derived at least in part from an aqueous colloidal silica sol. The resultant reaction mixture is placed in a container made, for example, of metal or glass. The container should be closed to prevent loss of water. The reaction mixture is then stirred to insure homogeneity.

The zeolite may be satisfactorily prepared at temperatures of from about 90° C. to 200° C. the pressure being atmospheric or at least that corresponding to the vapor pressure of water in equilibrium with the mixture of reactants at the higher temperature. Any suitable heating apparatus, e.g., an oven, sand bath, oil bath or jacketed autoclave, may be used. Heating is continued until the desired crystalline zeolite product is formed. The zeolite crystals are then filtered off and washed to separate them from the reactant mother liquor. The zeolite crystals should be washed, preferably with distilled water, until the effluent wash water, in equilibrium with the product, has a pH of between about 9 and 12. As the zeolite crystals are washed, the exchangeable cation of the zeolite may be partially removed and is believed to be replaced by hydrogen cations. Thereafter, the zeolite crystals may be dried, conveniently in a vented oven.

Zeolite L has been characterized in "Zeolite Molecular Sieves" by Donald W. Breck, John Wiley & Sons, 1974, as having a framework comprising 18 tetrahedra unit cancrinite-type cages linked by double 6-rings in columns and crosslinked by single oxygen bridges to form planar 12-membered rings. These 12-membered rings produce wide channels parallel to the c-axis with no stacking faults. Unlike erionite and cancrinite, the cancrinite cages are symmetrically placed across the double 6-ring units. There are four types of cation locations: A in the double 6-rings, B in the cancrinite-type cages, C between the cancrinite-type cages, and D on the channel wall. The cations in site D appear to be the only exchangeable cations at room temperature. During dehydration, cations in site D probably withdraw from the channel walls to a fifth site, site E, which is located between the A sites. The hydrocarbon sorption pores are approximately 7 to 8 Angstroms in diameter.

A more complete description of these zeolites is given, e.g., in U.S. Pat. No. 3,216,789 which, more particularly, gives a conventional description of these zeolites. U.S. Pat. No. 3,216,789 is hereby incorporated by reference to show a type L zeolite useful in the present invention.

Various factors have an effect on the X-ray diffraction pattern of a zeolite. Such factors include temperature, pressure, crystal size, impurities, and type of cations present. For instance, as the crystal size of the type L zeolite becomes smaller, the X-ray diffraction pattern becomes broader and less precise. Thus, the term "zeolite L" includes any zeolites made up of cancrinite cages having an X-ray diffraction pattern substantially similar to the X-ray diffraction patterns shown in U.S. Pat. No. 3,216,789.

Crystal size also has an effect of the run life of the catalyst. For reasons not yet fully understood, catalysts having at least 80% of the crystals of the type L zeolite larger than 1000 Angstroms give longer run length than catalysts having substantially all of the crystals of the type L zeolite between 200 and 500 Angstroms. Thus, large crystal-size type L zeolite is the preferred support.

Type L zeolites are conventionally synthesized largely in the potassium form, i.e., in the theoretical formula given previously, most of the M cations are potassium. The M cations are exchangeable, so that a given type L zeolite, e.g., a type L zeolite in the potassium form, can be used to obtain type L zeolites containing other cations, by subjecting the type L zeolite to ion exchange treatment in an aqueous solution of appropriate salts. However, it is difficult to exchange all of the original cations, e.g., potassium, since some cations in the zeolite are in sites which are difficult for the reagents to reach.

Group VIII Metals

The catalysts according to the invention are charged with one or more Group VIII metals, e.g., nickel, ruthenium, rhodium, palladium, iridium or platinum.

The preferred Group VIII metals are iridium and particularly platinum, which are more selective with regard to dehydrocyclization and are also more stable under the dehydrocyclization reaction conditions than other Group VIII metals.

The preferred percentage of platinum in the catalyst is between 0.1% and 5%, more preferably from 0.3% to 2.5%.

Group VIII metals are introduced into the L zeolite by synthesis, impregnation or exchange in an aqueous solution of an appropriate salt. When it is desired to introduce two Group VIII metals into the zeolite, the operation may be carried out simultaneously or sequentially.

By way of example, platinum can be introduced by impregnating the zeolite with an aqueous solution of tetrammineplatinum (II) nitrate, tetrammineplatinum (II) hydroxide, dinitrodiamino-platinum or tetrammineplatinum (II) chloride. In an ion exchange process, platinum can be introduced by using cationic platinum complexes such as tetrammineplatinum (II) nitrate.

Alkaline Earth Metals

A possible additional component of the present catalyst is an alkaline earth metal. That alkaline earth metal can be either barium, strontium or calcium. Preferably, the alkaline earth metal is barium. The alkaline earth metal can be incorporated into the zeolite by synthesis, impregnation or ion exchange. Barium is preferred to the other alkaline earths because the resulting catalyst has high activity, high selectivity and high stability.

In one embodiment, at least part of the alkali metal is exchanged with barium, using techniques known for ion exchange of zeolites. This involves contacting the zeolite with a solution containing excess $Ba^{++}$ ions. The barium should preferably constitute from 0.1% to 35% of the weight of the zeolite, more preferably from 8% to 15% by weight.

In order to obtain optimum selectivity, temperature should be adjusted so that reaction rate is appreciable, but conversion is less than 98%, as excessive temperature and excess reaction can have an adverse affect on selectivity. Pressure should also be adjusted within a proper range. Too high a pressure will place a thermodynamic (equilibrium) limit on the desired reaction, especially for hexane aromatization, and too low a pressure may result in coking and deactivation.

The primary benefit of this invention is in improving the sulfur tolerance of a catalyst having a high selectivity for conversion of acyclic hydrocarbons (especially $C_6$-$C_8$ paraffins) to aromatics. The catalyst also has excellent selectivity for conversion of methylcyclopentane to benzene. This reaction, which on conventional reforming catalysts based on chlorided alumina involves an acid catalyzed isomerization step, occurs on the catalyst of this invention with selectivity as good as or better than on the chlorided alumina based catalysts of the prior art.

Another advantage of this catalyst is that it is more stable than prior art zeolitic catalysts. Stability of the catalyst, or resistance to deactivation, determines its useful run length. Longer run lengths result in less down time and expense in regenerating or replacing the catalyst charge.

The bound zeolite can be washed with aqueous salt solution to assure that the proper amount of alkali or barium is present to make an active and selective catalyst. Too much alkali reduces catalyst life while too little results in a more acidic catalyst, which lowers the selectivity.

EXAMPLES

The invention will be further illustrated by the following examples which set forth a particularly advantageous method and composition embodiments. While the examples are provided to illustrate the present invention, they are not intended to limit it.

EXAMPLE 1

A sodium containing pseudoboehmite was prepared by mixing together, 36 gms of $NaAlO_2$ and 1044 gm of distilled water; adjusting the pH of the mixture to a pH of 8 with $HNO_3$; putting the solution in teflon bottles and putting the bottles in an autoclave with water up to the bottle necks. The solution was aged for 48 hours at 95° C., then the bottles were removed from the autoclave and allowed to cool. The solution was then filtered, washed with water, and dried at 250° F. for 16 hours. When analyzed by X-ray diffraction, the alumina phase present was chiefly pseudoboehmite.

6.3 gm of this alumina was mulled with 11.7 gm of type L zeolite in 18 ml of water containing 0.13 ml of 70.4% conc. nitric acid. This mulled solution was extruded with a 1/16" die diameter to form an extrudate, and the extrudate was dried overnight at 250° F. The extrudate was divided into two parts.

6.26 gm of the extrudate was put into a polypropylene bottle, and then 62.6 ml of 0.3 ml $Ba(NO_3)_2$ solution was added.

This material was exchanged in 80° C. oven for 3 hours, then filtered and washed, dried overnight at 250° F., and calcined at 1100° F., for 16 hours. A pore fill impregnation with $Pt(NH_3)_4(NO_3)_2$ to 0.8 wt % of the zeolite was done on 2 gm of the catalyst. The catalyst was dried at room temperature for 2 hours, then dried for 2 hours at 250° F. and calcined in flowing air for 2 hours at 500° F.

EXAMPLE II

A potassium containing pseudoboehmite was prepared by mixing together 34.82 gm of $Al(OH)_3$, 40.65 gm of KOH of 86% minimum purity and 50 gm of distilled water; heating to 105° C. until the solution became clear; adding 965 ml of distilled water; adjusting the pH of the cooled mixture to a pH of 8 with $HNO_3$; putting the solution in teflon bottles and putting the bottles in an autoclave with water up to the bottle necks. The solution was aged for 48 hours at 95° C., then the bottles were removed from the autoclave and allowed to cool. The solution was then filtered, washed with water, and dried at 250° F. for 16 hours. When analyzed by X-ray diffraction, the alumina phase present was chiefly pseudoboehmite, with bayerite also present.

12.25 gm of this potassium containing pseudoboehmite was mulled with 22.75 gm of type L zeolite in 20 ml of water containing 0.24 ml of 70.4% conc. nitric acid. This mulled solution was extruded with a 1/16" diameter die to form an extrudate, and the extrudate was dried overnight at 250° F. The extrudate was divided into two parts.

12.6 gm of the extrudate was put into a polypropylene bottle and then 126 ml of 0.3 ml Ba solution was added. This material was exchanged in an 80° C. oven for 3 hours, then filtered and washed, dried overnight at 250° F., and calcined at 1100° F. for 16 hours. A pore fill impregnation with 0.8% $Pt(NH_3)_4(NO_3)_2$ based on the zeolite weight was done on 2 gms of the catalyst. The catalyst was dried for 2 hours at room temperature and then was dried for 2 hours at 250° F. and calcined for 2 hours at 500° F. in flowing air.

EXAMPLE III

A catalyst was prepared by the procedure of putting a type L zeolite of crystallite size greater than 1000 Angstroms as determined by X-ray diffraction into a ten times excess of a solution of 0.3 molar $Ba(NO_3)_2$ in $H_2O$. This solution was placed in a closed container in an oven for 3 hours at 80° C., then the solids were filtered and washed with a ten times excess of water. The solids were then dried overnight at 250° F. in air, calcined at 1100° F. for 16 hours in air, and screened to 24/80 mesh, and then a solution of $Pt(NH_3)_4(NO_3)_2$ in water was added to an amount equal to 0.8% Pt by weight of zeolite. The resulting catalyst was dried overnight at 250° F. in air, and calcined for 2 hours at 500° F. in air. The catalyst was prereduced before the hydrocarbon feed was introduced.

EXAMPLE IV

The catalyst of Example III was subjected to a sulfur tolerance test. 0.6 gms of the catalyst, sieved to 24/80 mesh, was charged to a reactor. The catalyst was reduced in flowing $H_2$ for ½ hour at 400° F., 10 minutes at 700° F., and 1 hour at 920° F. The vessel was then pressured up to 100 psig, the $H_2$ flow reduced and hydrocarbon feed and sulfur started. The run conditions were 100 psig, 6 LHSV of hydrocarbon feed, $6H_2/HC$ and 920° F. Sulfur, as dimethyl disulfide mixed with the hydrocarbon feed, was injected via a syringe through a septum above the reactor. Hourly online gas chromatographic samples were taken of the reactor effluent stream. Table I summarizes the results. Without sulfur addition, the catalyst deactivation was slight. With sulfur addition, the catalyst was almost completely deactivated.

EXAMPLE V

The catalyst of Example I was subjected to the same test detailed in Example IV. 0.75 gm of 24/80 mesh material was used.

EXAMPLE VI

The catalyst of Example II was subjected to the same test detailed in Example IV. 0.77 gms of 24/80 mesh materials was used.

Thus, in operation, an alkali containing binder is useful as protection from sulfur poisoning. It is thought that the efficiency of the sorption is proportional to the amount of alkali or alkaline earth component on the binder, and that the component reacts with the sulfur. It can be seen from the examples that if the alumina is too well washed, such that the alkali or alkaline earth level of the final catalyst is too low, the sorption is not as effective as if more alkali or alkaline earth component is present in the finished catalyst.

TABLE

|  | HR. 2 | | | HR. 10 | | | HR. 20 | | |
| --- | --- | --- | --- | --- | --- | --- | --- | --- | --- |
|  | EX IV | EX V | EX VI | EX IV | EX V | EX VI | EX IV | EX V | EX VI |
| Sulfur added, ppm in feed | 8.0 | 8.7 | 8.6 | | | | | | |
| Catalyst weight, gms | .6 | .75 | .77 | | | | | | |
| Conversion, % of $C_6+$ paraffins and cyclopentanes | 68.3 | 61.1 | 56.0 | 41.4 | 58.1 | 41.4 | 3.0 | 55.8 | 16 |
| Selectivity to aromatics | 87 | 88 | 90 | 91 | 91 | 93 | 100 | 94 | 100 |
| $C_1$ SCF/Bbl | 170 | 125 | 116 | 78 | 106 | 73 | 6 | 97 | 27 |
| $H_2$, SCF/Bbl | 2014 | 1876 | 1766 | 1350 | 1853 | 1394 | 251 | 1867 | 667 |
| Analyses, neutron activation | | | | | | | | | |
| Na | | 520 ppm | 90 ppm | | | | | | |
| K | | 6.38% | 6.33% | | | | | | |
| Ba | | 7.96% | 7.57% | | | | | | |

While the present invention has been described with reference to specific embodiments, this application is intended to cover those various changes and substitutions which may be made by those skilled in the art without departing from the spirit and scope of the appended claims.

What is claimed is:

1. A catalyst comprising a zeolite bound with an alkali containing alumina or an alkaline earth containing alumina.

2. A catalyst according to claim 1 wherein said alumina contains at least 100 ppm alkali or alkaline earth.

3. A catalyst according to claim 1 wherein said zeolite is a large-pore zeolite.

4. A method of forming a catalyst comprising:
 (a) forming a solution of an alkali metal aluminate or an alkaline earth metal aluminate;
 (b) adjusting the pH of said aluminate solution to a pH of from 6 to 8;
 (c) aging said aluminate solution;
 (d) mulling said aluminate solution with a large-pore zeolite to form a mixture; and
 (e) extruding said mixture to form an extrudate.

5. A method of forming a catalyst according to claim 1 comprising the further steps of:
 (f) drying said extrudate;
 (g) calcining said dried extrudate;
 (h) impregnating said calcined extrudate with a Group VIII metal to form a catalyst;
 (i) drying said catalyst; and
 (j) calcining said dried catalyst.

6. A method of forming a catalyst according to claim 4 wherein the pH of said aluminate solution is adjusted in step (b) by adding nitric acid.

7. A method of forming a catalyst according to claim 4 wherein said aluminate solution is aged in step (c), and then washed prior to mulling.

8. A method of forming a catalyst according to claim 4 wherein said washed aluminate solution of step (c) is dried prior to mulling in step (d).

9. A method of forming a catalyst according to claim 4 wherein said large-pore zeolite has an apparent pore size of from 7 to 9 Angstroms.

10. A method of forming a catalyst according to claim 6 wherein said large-pore zeolite is selected from the group consisting of zeolite X, zeolite Y and type L zeolite.

11. A method of forming a catalyst according to claim 7 wherein said large-pore zeolite is zeolite Y.

12. A method of forming a catalyst according to claim 7 wherein said large-pore zeolite is a type L zeolite.

13. A method of forming a catalyst according to claim 9 wherein the majority of the crystals of said type L zeolite are larger than 500 Angstroms.

14. A method of forming a catalyst according to claim 10 wherein the majority of the crystals and said type L zeolite are larger than 1000 Angstroms.

15. A method of forming a catalyst according to claim 11 wherein at least 80% of the crystals of said type L zeolite are larger than 1000 Angstroms.

16. A method of forming a catalyst according to claim 4 wherein said extrudate of step (e) is ion exchanged with an alkaline earth metal selected from the group consisting of barium, strontium, and calcium, 17. A method of forming a catalyst according to claim 13 wherein said alkaline earth metal is barium and wherein said Group VIII metal is platinum.

18. A method of forming a catalyst according to claim 14 wherein said method of forming a catalyst has from 0.1% to 35% by weight barium and from 0.1% to 5% by weight platinum.

19. A method of forming a catalyst according to claim 15 wherein said method of forming a catalyst has from 8% to 15% by weight barium and from 0.3% to 2.5% by weight platinum.

20. A method of forming a catalyst according to claim 5 wherein said impregnation in step (h) is conducted with a solution selected from the group consisting of $Pt(NH_3)_4(NO_3)_2$ and $Pt(NH_3)_4Cl_2$.

21. A method of forming a catalyst comprising:
 (a) forming a solution of sodium aluminate;
 (b) adjusting the pH of said sodium aluminate solution with nitric acid to a pH of 8;
 (c) aging said sodium aluminate solution;
 (d) washing said aged sodium aluminate solution;
 (e) drying said washed sodium aluminate solution;
 (f) mulling said dried sodium aluminate solution with a type L zeolite to form a mixture, wherein at least 80% of the crystals of said type L zeolite are larger than 1000 Angstroms;
 (g) extruding said mixture to form an extrudate;
 (h) ion exchanging said extrudate with a barium solution to form an extrudate containing from 8% to 15% by weight barium;
 (i) drying said extrudate;
 (j) calcining said dried extrudate;
 (k) impregnating said calcined extrudate with a platinum-containing solution to form a catalyst;
 (l) drying said catalyst; and
 (m) calcining said dried catalyst.

* * * * *